(12) United States Patent
McClintock et al.

(10) Patent No.: US 7,091,933 B2
(45) Date of Patent: Aug. 15, 2006

(54) ELECTRONIC INFORMATION DISPLAY SYSTEM

(75) Inventors: Dale Thomas McClintock, Hilliard, OH (US); James Reynell King, Columbus, OH (US)

(73) Assignee: Imagearray, LTD, Columbus, OH (US)

( * ) Notice: Subject to any disclaimer, the term of this patent is extended or adjusted under 35 U.S.C. 154(b) by 121 days.

(21) Appl. No.: 10/266,955

(22) Filed: Oct. 8, 2002

(65) Prior Publication Data

US 2003/0069891 A1    Apr. 10, 2003

Related U.S. Application Data

(60) Provisional application No. 60/327,656, filed on Oct. 8, 2001.

(51) Int. Cl.
*G09G 3/20* (2006.01)
*G09G 5/00* (2006.01)

(52) U.S. Cl. .................. 345/55; 345/1.1; 345/1.3; 345/2.1; 345/3.3

(58) Field of Classification Search ............ 345/51–56, 345/1.3, 1.1, 473, 723, 1.2, 2.1, 3.3, 903; 358/335–343; 386/54; 348/563, 565, 567, 348/588; 349/58–65
See application file for complete search history.

(56) References Cited

U.S. PATENT DOCUMENTS

| | | | |
|---|---|---|---|
| 4,703,423 A | 10/1987 | Bado et al. | |
| 4,738,042 A | 4/1988 | Corden et al. | |
| 4,797,914 A | 1/1989 | Vaello | |
| 5,111,631 A | 5/1992 | Flood et al. | |
| 5,133,081 A | 7/1992 | Mayo | |
| 5,218,348 A | 6/1993 | Trotta | |
| 5,258,906 A | 11/1993 | Kroll et al. | |
| 5,299,117 A | 3/1994 | Farnbach | |
| 5,310,997 A | 5/1994 | Roach et al. | |
| 5,335,081 A * | 8/1994 | Yamaguchi et al. | .......... 386/54 |
| 5,357,895 A | 10/1994 | Ceko | |
| 5,363,577 A | 11/1994 | Fuller et al. | |
| 5,368,129 A | 11/1994 | Von Kohorn | |
| 5,396,417 A | 3/1995 | Burks et al. | |
| 5,434,394 A | 7/1995 | Roach et al. | |
| 5,448,226 A | 9/1995 | Failing, Jr. et al. | |
| 5,451,839 A | 9/1995 | Rappaport et al. | |
| 5,465,085 A | 11/1995 | Caldwell et al. | |
| 5,504,482 A | 4/1996 | Schreder | |
| 5,594,740 A | 1/1997 | LaDue | |
| 5,606,374 A | 2/1997 | Bertram | |
| 5,612,741 A | 3/1997 | Loban et al. | |

(Continued)

FOREIGN PATENT DOCUMENTS

WO    WO 98/26399    6/1998

OTHER PUBLICATIONS

Bluepoint Technologies Promotional Material, 2000.

(Continued)

*Primary Examiner*—Vijay Shankar
(74) *Attorney, Agent, or Firm*—Calfee, Halter & Griswold LLP

(57) ABSTRACT

Methods are provided for distributing a visual presentation. One described method includes storing show data and media referenced by the show data at a data center. The method also includes processing the show data and media to generate a set of visual presentation data files. The method further includes distributing each visual presentation data file to at least one digital playback device. Systems are also provided to implement the described methods.

10 Claims, 17 Drawing Sheets

U.S. PATENT DOCUMENTS

| | | |
|---|---|---|
| 5,619,416 A | 4/1997 | Kosarew |
| 5,657,004 A | 8/1997 | Whittaker et al. |
| 5,704,049 A | 12/1997 | Briechle |
| 5,730,316 A | 3/1998 | Falk |
| 5,737,194 A | 4/1998 | Hopkins et al. |
| 5,801,785 A * | 9/1998 | Crump et al. .............. 348/563 |
| 5,805,117 A | 9/1998 | Mazurek et al. |
| 5,805,578 A | 9/1998 | Stripe et al. |
| 5,838,286 A | 11/1998 | Pfeiffer et al. |
| 5,848,129 A | 12/1998 | Baker |
| 5,905,493 A | 5/1999 | Belzer et al. |
| 5,916,024 A | 6/1999 | Von Kohorn |
| 5,966,696 A | 10/1999 | Giraud |
| 6,012,045 A | 1/2000 | Barzilai et al. |
| 6,012,244 A | 1/2000 | Begum et al. |
| 6,018,408 A | 1/2000 | Hong |
| 6,117,011 A | 9/2000 | Lvov |
| 6,130,603 A | 10/2000 | Briechle |
| 6,133,985 A | 10/2000 | Garfinkle et al. |
| 6,169,632 B1 | 1/2001 | Kurtenbach et al. |
| 6,189,246 B1 | 2/2001 | Gorthala |
| 6,191,825 B1 | 2/2001 | Sprogis et al. |
| 6,217,966 B1 | 4/2001 | Finster et al. |
| 6,222,530 B1 | 4/2001 | Sequeira |
| 6,226,931 B1 | 5/2001 | Haversat |
| 6,278,466 B1 | 8/2001 | Chen |
| 6,288,688 B1 | 9/2001 | Hugues et al. |
| 6,314,669 B1 | 11/2001 | Tucker |
| 6,321,287 B1 | 11/2001 | Rao et al. |
| 6,351,468 B1 | 2/2002 | LaRowe et al. |
| 6,376,805 B1 | 4/2002 | Faries et al. |
| 6,421,706 B1 | 7/2002 | McNeil et al. |
| 6,452,612 B1 | 9/2002 | Holtz et al. |
| 6,476,883 B1 | 11/2002 | Salimes et al. |
| 6,611,241 B1 | 8/2003 | Firester et al. |
| 6,618,529 B1 | 9/2003 | Lowry |
| 6,625,656 B1 | 9/2003 | Goldhor et al. |
| 6,640,145 B1 | 10/2003 | Hoffberg et al. |
| 6,657,638 B1 | 12/2003 | Kamba |
| 2001/0005364 A1 | 6/2001 | Kang |

OTHER PUBLICATIONS

SI Diamond Technology Web Pages from http://www.sidiamond.com, Printed Aug. 8, 2001.

* cited by examiner

ELECTRONIC INFORMATION DISPLAY SYSTEM

CROSS-REFERENCE TO RELATED APPLICATION

This application claims priority to U.S. Provisional Application entitled "Electronic Information Display System," Ser. No. 60/327,656, filed Oct. 8, 2001, which is incorporated herein by reference in its entirety.

BACKGROUND OF THE INVENTION

1. Field of the Invention

The present invention relates generally to electronic systems that distribute and display visual presentations, and specifically to electronic information display systems that include arrays of display devices that cooperate to provide a unified presentation of various media.

2. Description of the Related Art

Certain methods and systems for producing, distributing and displaying visual presentations are well known. Such known methods and systems include creating, distributing and displaying printed placards, employing stand-alone computers to display pre-programmed presentations, and employing video monitors or video walls to display pre-recorded or streaming visual presentations. Many of these methods and systems are used at the point-of-purchase in retail environments to influence customer purchasing decisions.

The more traditional process of designing, creating, distributing, and installing printed materials still takes months to accomplish, while consumer buying trends around the world change virtually overnight. Furthermore, traditional ink on paper displays can only present consumers with still, flat images, while at the same time, the electronic and digital revolution has conditioned consumers to notice and respond to moving images and information displayed in various more dynamic electronic formats.

The use of stand-alone computers and video walls provide a more animated presentation, however creation of the visual presentations is cumbersome, as is distribution of the completed presentation. Furthermore, use of such systems is labor intensive and there is limited control regarding the consistency of displays throughout locations of a distributed organization. Specifically, maintaining the equipment requires technical competence and it is difficult to ensure that all locations are displaying the most up-to-date presentation.

Given the deficiencies in the art, a need exists for a presentation method and system that ensures presentation consistency between locations in a distributed organization. A need further exists for a presentation system that may be easily maintained by non-technical personnel. Yet another need exists for a method and system that enables efficient distribution of visual presentations to all locations in a distributed organization. Still another need exists for a scaleable multi-panel display array that produces a high resolution image regardless of the display dimensions.

SUMMARY OF THE INVENTION

The following presents a simplified summary of methods and systems associated with the electronic information display of the present invention. This summary is not an extensive overview and is not intended to identify key or critical elements of the methods and systems or to delineate the scope of the methods and systems. It conceptually identifies the methods and systems in a simplified form as a prelude to the more detailed description that is presented later.

This disclosure provides methods and systems relating to an electronic information display. According to one aspect of the disclosure, a method for distributing a visual presentation is disclosed. The method includes storing show data and media referenced by the show data at a data center. The method also includes processing the show data and media to generate a set of visual presentation data files. The method further includes distributing each visual presentation data file to at least one digital playback device.

According to another aspect of the disclosure, a method for distributing an audio/visual presentation is disclosed. The method includes storing show data and media on a central server. The method also includes processing the show data and media to create a set of audio/visual presentation data files. Each audio/visual presentation data file represents a segment of an audio/visual presentation. The set of audio/visual presentation data files is transmitted from the central server to a local controller which transmits each audio/visual presentation data file to at least one associated digital playback device. The method further includes processing the audio/visual presentation data files at the associated digital playback devices to render the audio/visual presentation.

According to yet another aspect of the disclosure, a visual presentation distribution and control system is disclosed. In one embodiment, the system includes a data center including stored show data and media. The show data represents a visual presentation and the media is referenced by the show data. The data center is operative to process the show data and media to generate a set of visual presentation data files. Each visual presentation data file represents a segment of a visual presentation. The system also includes a display array comprising a set of digital playback devices. Each digital playback device is configured to process a visual presentation data file. The system further includes a local controller in communication with the data center and the set of digital playback devices. The local controller includes control logic to receive and distribute each visual presentation data file to an associated digital playback device.

Certain illustrative aspects of the methods and systems are described herein in connection with the following description and the annexed drawings. These aspects are indicative, however, of but a few of the various ways in which the principles of the methods and systems may be employed and thus the examples are intended to include such aspects and equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which.

DETAILED DESCRIPTION OF THE DRAWINGS

Figure 1A:
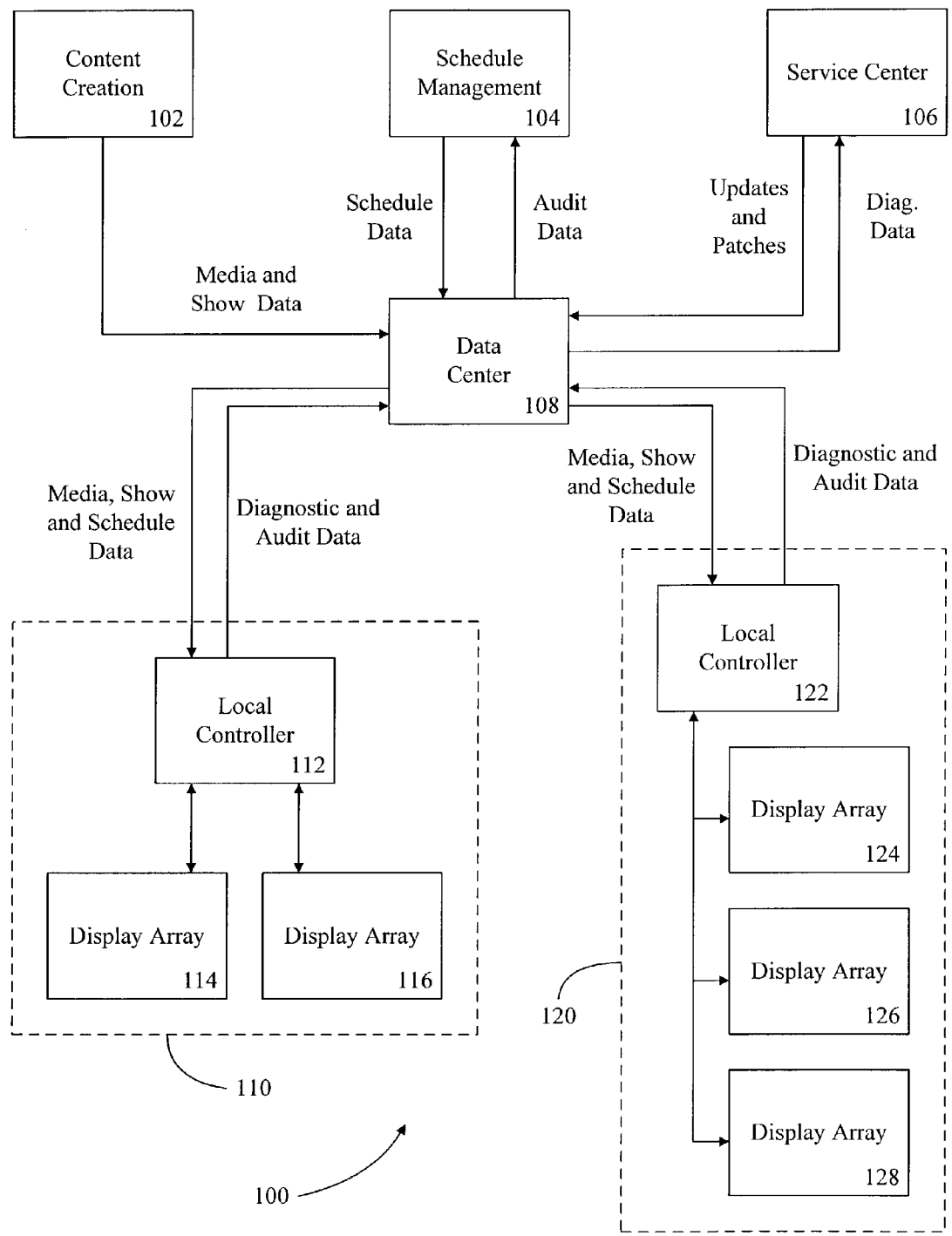
FIG. 1A is a schematic block diagram of certain components of an electronic information display system in accordance with the present invention.

Generally, the present invention facilitates creating, editing and distributing visual presentation data for displaying visual presentations at remote locations on display arrays. Each display arrays is made up of a set of digital playback units or devices ("DPU") cooperating to provide a unified presentation. As best shown in FIG. 1a, one embodiment of the present invention includes certain basic components that function together as an electronic information display system 100 which may be used to create/edit, distribute and present data or information in audio/visual form. System 100 is intended to be used in a retail environment to display point of purchase merchandising and/or advertising information. System 100 reduces or eliminates the need for printed advertising to be displayed in a retail establishment.

System 100 and other systems that embody the present invention enable efficient and expedient delivery of dynamic advertising and/or other pertinent information to distributed locations. Although the invention is described with respect to a retail environment, the invention would also be useful in any application in which information is presented to a viewer, such as with signage in airports, convention facilities, shopping centers/malls, amusement parks, arenas, stadiums, parks, sidewalks and other public places. The invention further would be useful for displaying movies and/or other entertainment related program material in public or private theaters and/or public or private viewing rooms.

The invention would be useful in displaying of artwork or other static or motion graphic imagery as may be displayed in homes or museums. In addition, the invention would be useful in presenting corporate video, graphics, and/or other corporate communication materials in corporate offices, manufacturing facilities, warehouses, boardrooms, training rooms, marketing rooms, meeting rooms, lobbies, auditoriums, convention facilities, etc.

Content Creation

System 100 includes at least one content creation computer or workstation 102 which may be used to create and/or edit media to be used in a show. For purposes of this application, media includes any means for transmitting presentation elements, such as streaming digital audio and/or video data, radio frequency television signals and JPEG, GIF, AVI, MPEG, WAV and MP3 data files, for example. A show includes any type of presentation, such as a 30 second full motion video commercial, a static sign display, or an audio presentation, for example.

In the present example, content creation computer 102 may be operated by an in-house advertising division of a retail chain or an advertising agency creating content on behalf of the retail chain. Content creation computer 102 may include software for authoring, converting or re-purposing media, and for creating and editing data defining a show. Content creation computer 102 transmits the media and show data to a data center 108 for distribution to one or more display locations, such as retail outlets 110 and 120.

The authoring software may be used to create and edit the various types of media that will ultimately be displayed on the individual or arrayed digital playback units. The re-purposing software is capable of converting or changing widely used formats of text, graphic images, and other media into shapes and forms that are significantly different from the original shape and form of these images. This changing or altering of images, data, or information is referred to as "re-purposing." One purpose of re-purposing an image is to divide the complete image into image subunits that may then be distributed to an array of digital playback units preferably by a local controller. Distributing a re-purposed image to an array of digital playback units and displaying the image in synchronization produces the effect of a single graphic or other form of media spanning the multiple screens of the arrayed digital playback units.

For example, an image or graphic has an initial resolution of 1024×768 pixels. The system user wishes to alter or "stretch" that image so that it may be displayed in an array of DPUs consisting of 144 screens, 12 screens wide and 12 screens high, each screen having a native resolution of 1024×768 pixels. In order to maintain the clarity of the original image while stretching it to fill 144 screens, the image must be re-purposed using the software of the present invention. The individual values of the inline pixels are interpolated by the re-purposing software component to prevent the image from appearing only as large blocks.

Schedule Management

System 100 also includes at least one schedule management computer or workstation 104 which may be used to define and manage schedule data indicating dates and times that certain shows are to be presented on certain display devices. Schedule management computer 104 transmits the schedule data to data center 108 for distribution to the display locations. The schedule management computer 104 also receives audit data from the data center 108. The audit data may be used by the schedule management computer 104 to update future show schedules.

Like content creation computer 102, schedule management computer 104 may be operated by the owner of the retail chain or a designated agent, and may include software for defining and managing the scheduling of shows at display locations. Schedule management computer 104 may also include software analyzing auditing information received from data center 108. As with other software applications described herein, the schedule management and audit analysis software may be locally resident, in this case resident on schedule management computer 104, or it may be a client-server application received, for example, over the Internet as a Java or other application.

Schedule management computer 104 includes schedule management software for the scheduling playback of various forms of media. This function allows various advertisements or other visual presentations to be displayed at predetermined times, in a predetermined order, on predetermined display arrays, and for predetermined lengths of time. The management subcomponent also permits the addition of new media and the removal of outdated or otherwise undesirable information.

Media playback scheduling can be tailored to suit the needs of the various merchants or retailers who are utilizing the system of the present invention. Media may be scheduled to be played back a single time on a particular date at a particular time, multiple times on particular dates and at particular times, or periodically at predetermined dates and times or intervals (e.g., "every day at 7 AM," or "on Fridays at 3 PM until Nov. 1, 2001," or "every two hours," etc.). Additionally, changing the order and the content of the information being displayed on various display arrays can be done on demand. Thus, the management subcomponent offers maximum flexibility to the users of this information display system.

For example, the owner of a shopping mall installs a large display array and contracts with the merchants or retailers who have businesses in the shopping mall for use of the array for purposes of advertising the merchant's or retailer's products or services. These merchants and/or retailers may number in the dozens or even hundreds. The schedule management software of the present invention permits each participating merchant to display specific pieces of media at certain times for a specific number of days or weeks. The schedule management software allows the merchants and/or system manager to constantly interact with the display array and control what is being displayed on the array.

Schedule management computer 104 includes an auditing system subcomponent that stores and displays, in written form, the show that has been or is being displayed on a display array, as well as specific information related to the timing of particular shows. This software component of the present invention includes an auditing function, which can be accessed and viewed from client-accessible web browsers. Results of an audit can be downloaded for filing and archiving purposes or may be automatically e-mailed to clients. This auditing function is particularly advantageous when cost analysis or cost tracking is important to a particular client.

Service Center

The system 100 further includes at least one service center computer or workstation 106 which may be used to monitor and control the components of the system, such as data center 108, for example. Service center 106 receives diagnostic data from various components of system 100 and may use the diagnostic data in determining whether and when to transmit updates, patches or commands to one or more components of the system. It should be recognized that the functionality of content creation computer 102, schedule management computer 104 and service center 106 may be combined into a single computer or distributed among many computers without deviating from the scope of the present invention.

Data Center

Data center 108 includes a data storage facility for storing the media, show and schedule data received from computers 102, 104 and 106. Data center 108 may also include software for maintaining the media, show and schedule data. Of course, any software for maintaining the data stored at data center 108 may be browser accessible.

Data center 108 further includes software for distributing the media, show and schedule data to one or more controllers, each responsible for managing the presentations at a display location, such as local controllers 112 and 122 which respectively control display locations 110 and 120. Data center 108 may include various back up safeguards, such as uninterruptible power supplies, mirrored drives or a duplicate FTP data center, for example. Such backup safeguards ensure uninterrupted data transmission and retrieval even in the event of unforeseen occurrences such as natural disasters, power outages, and local emergencies. Multiple backup remote database storage and distribution sites also ensure that the proper bandwidth is maintained for expedient transmission of new data.

Data center 108 may also distribute DPU firmware and software updates automatically; reducing the need for on-site maintenance. The software embedded on each digital playback unit reports diagnostic information back to the service center by means of the local controller, thereby alerting the system administrator (service center) to potential hardware failures and the need for firmware upgrades. Advantageously, the software of the present invention permits an unlimited number of redundant (i.e., arrays displaying the same content) DPU sites to be updated simultaneously through a single management session.

In one embodiment, data is transmitted to/from system components, such as data center 108, via an Internet connection. Of course, data may be transmitted via any conventional means, including, for example, a Local Area Network ("LAN"), a Wide Area Network ("WAN"), a Virtual Private Network ("VPN"), a satellite link, a microwave link or any combination of conventional communication means.

Display Locations

Each display location (110 and 120) includes at least one local controller (114 and 116) in communication with digital playback units of at least one display array (114, 116, 124, 126 and 128). The local controller manages the media, show and schedule data received from the data center 108, distributes real-time information to each digital playback unit within a display array, generates synchronization time stamps and reports status, usage and other diagnostic information to data center 108 for further reporting to schedule management computer 104 and service center computer 106.

Figure 1B:
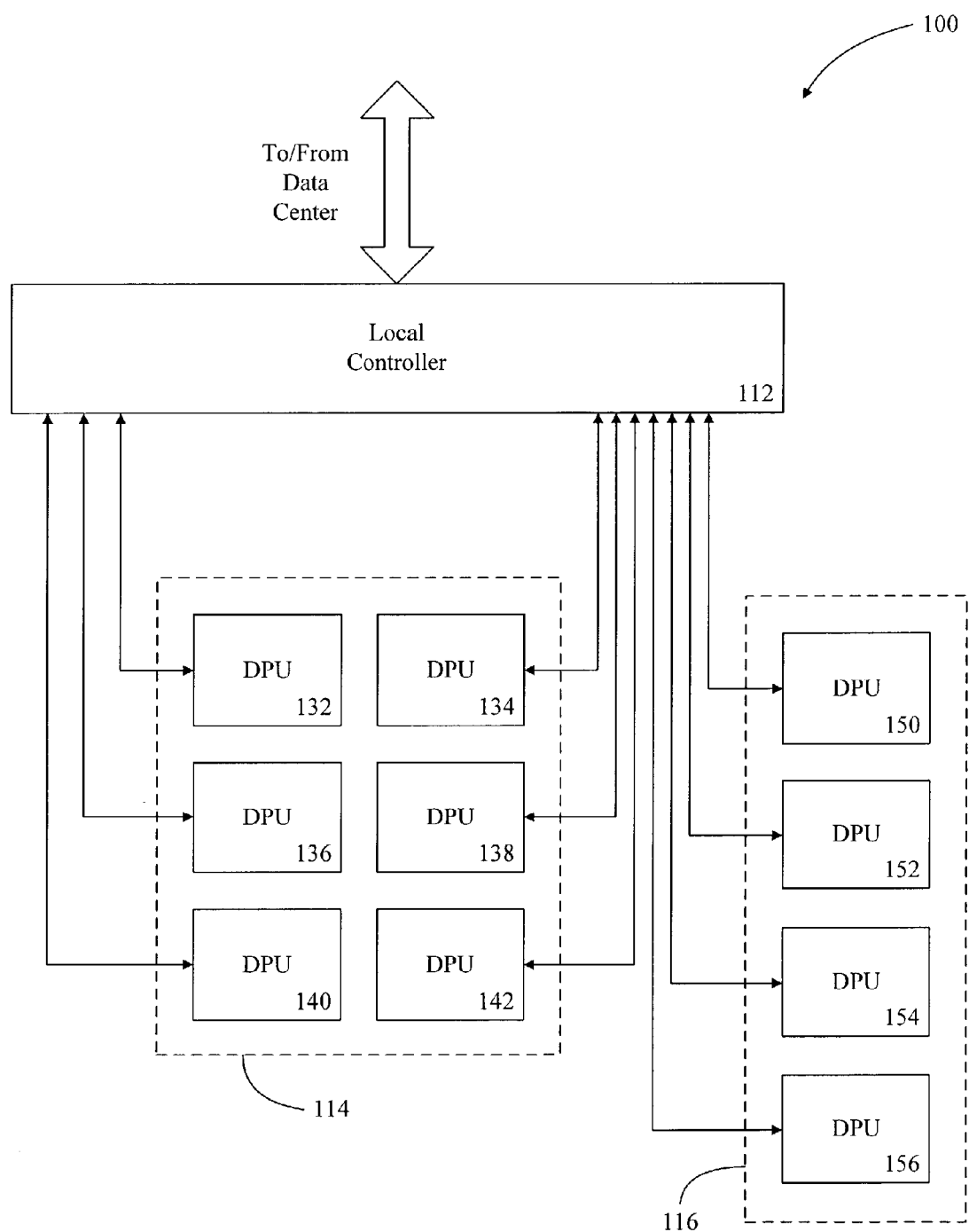
FIG. 1B is a schematic block diagram of certain components of the local controller of FIG. 1A in accordance with the present invention.

Referring now to FIG. 1B, a more detailed view of display location 110 is depicted. Display location 110 includes a local controller 112 and two display arrays 114 and 116. The display area of display array 114 is divided into a 2×3 array of six (6) segments. Each segment of the display area is provided by a separate digital playback unit, specifically DPU's 132, 134, 136, 138, 140 and 142. The display area of display array 116 is divided into a 1×4 array of four (4) segments. Each segment of the display area is provided by a separate digital playback unit, specifically DPU's 150, 152, 154, and 156.

Local Controller

In the illustrated embodiment, local controller 112 is a computing device employing networking hardware and software for receiving and transmitting information to other components within system 100. Local controller 112 preferably serves as a network router and a DPU controller. As a network router, local controller 112 manages communication between the Internet or other external network connection and the local area network, which connects the digital playback units in one or more particular arrays. The local controller allows the service center to communicate with the individual digital playback units and allows the individual digital playback units to provide information to the service center.

Local controller 112 includes significant solid state and/or rotating storage, and distributes media, show and schedule data received from data center 108 to display arrays 114 and 116. To support the functionality described throughout this application, local controller 112 may include the following software sub-components:

Remote Access Client—Software component enabling remote communication with data center 108.

Sign Management File—A file that resides on the local controller, which indicates the time and duration that a particular show should be presented. The show data may also include instructions regarding how to respond to external events and failure mode response information.

Self Discovery Assist/Assignment Module—Software enabling and/or assisting a DPU to determine the geometry of an associated display array.

Show and Scheduling distribution Module—Software component responsible for delivering media, show and schedule information to all associated DPU's.

System Health and Diagnostic Module—Software that monitors and tracks the overall health of the system by issuing and responding to simple networking commands.

Wide Area Network Gateway Manager—Software enabling direct access to the individual DPU's from data center 108, service center 106 or other component for diagnostic and maintenance services.

Brightness Equalization Calculator Module—Software that calculates the optimal brightness for a particular sign based upon system and/or external data.

Display Consistency Module—Software that manages and adjusts DPU's within a display array to provide a more consistent presentation.

Show audit manager—Software that makes a log of all shows presented at the display location.

Network health monitor Module—Software the enables monitoring of the local network.

Sign Synchronization Pulse Module—Software for generating a pulse that is transmitted over the network to synchronize the playback on a set of DPU's so that they function in unison to present a single unified presentation.

DPU firmware update Module—Software that enables the updating of the application and/or operating system software that runs on all resident DPU's.

External I/O Module—Software that associates shows with external events.

Digital Playback Units

Figure 2:
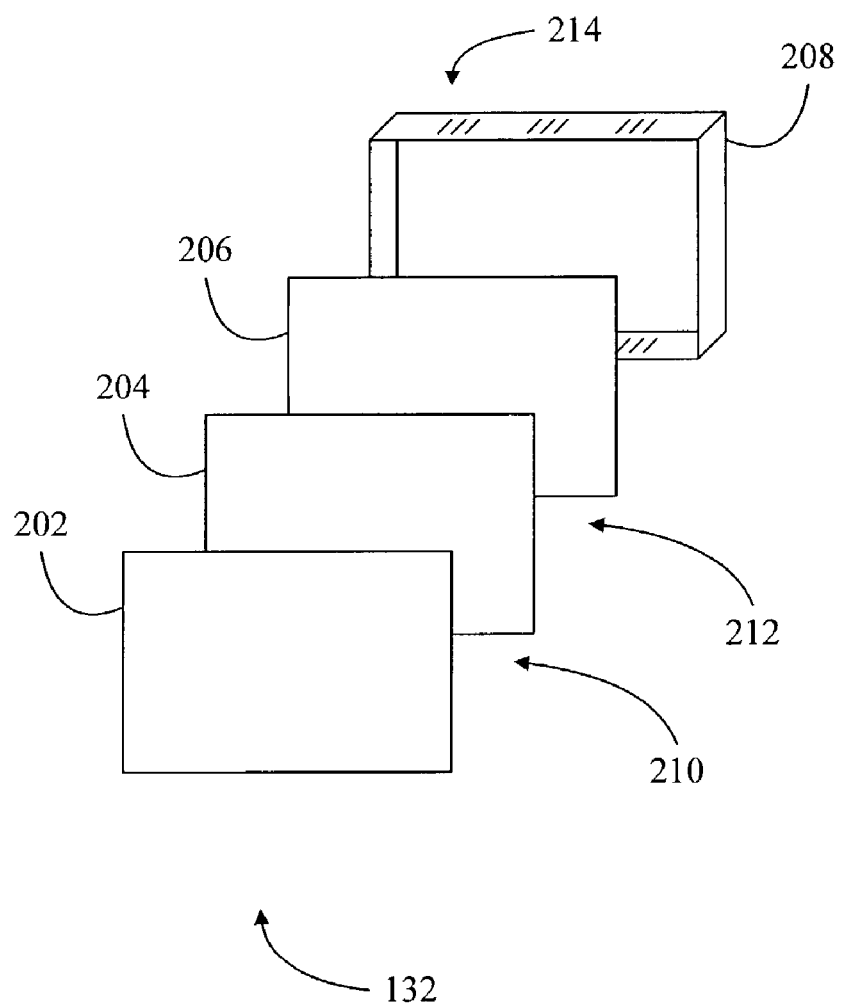
FIG. 2 is an exploded view of a digital playback device in accordance with one embodiment of the present invention.

FIG. 2 is an exploded view of exemplary digital playback unit 132. The illustrated digital playback unit 132 is an individual display unit that has the capability of operating as a stand-alone unit or operating in combination with other digital playback units to form a larger display. These digital playback units may be arrayed in any of a variety of configurations to present shows comprising one or more forms of media including, for example, graphics, digital video, and text.

In the illustrated embodiment, each digital playback unit includes a graphic display device such as, for example, a thin-mullion LCD panel 202. The LCD panel 202 is amplified by a backlight panel 204. LCD panel 202 is driven by a single-board computer 206, and all elements of the DPU are enclosed within a housing 208.

Single-board computer 206 preferably includes at least one processor, memory, file storage, display processing, networking, and other electronics necessary for storage, playback and display of various types of digital graphic imagery. DPU 132 may also contain an audio sub-system (not shown) for storage and playback of audio program material. The audio sub-system may be either built-in to DPU 132 or as an accessory to be attached to the unit.

Preferably, the storage capacity of DPU 132 is adequate for storing an entire presentation. The playback circuitry reproduces an audio/video presentation with precise timing generated over a local network by the local controller. Because content can be presented in many different formats, the playback function is preferably implemented by a CPU assisted with hardware accelerator for computationally intensive tasks.

Thermal and environmental challenges are overcome by separating the heat generating appliances of the digital playback unit into individual compartments, and providing an airspace, such as airspaces 210 and 212 between each compartment. The compartments are specifically designed to transfer or thermally conduct the heat of the appliances and/or components contained within them into the airspace. The heat is then transferred into the air in the airspace and is carried away via a system of integrated supply and exhaust ducts, such as vent 214. Of course, in colder environments, externally provided warm air may be conducted into the airspaces to maintain a minimum operating temperature.

Digital playback unit 132 contains certain software for the network management, scheduled playback and display of the information specific to the display. Each digital playback unit is self-contained and may operate independently or in synchronization with others. To support the functionality described throughout this application, each DPU may include the following software sub-components:

Playback Software—Software enabling playback of media and show data.

Self Discovery Response client—Software assisting in the discovery of sign geometry.

Brightness Control Client—Software which responds to a system brightness command and which controls the DPU's brightness.

Digital Playback Unit Status and Failure Client—Software that executes in the event of system failure or lack of networking communication System synchronization response client—Software that responds to a synchronization pulse transmitted by local controller 112.

Sync Response File—File distributed to DPU by local controller 112 which contains information about how the DPU should respond to a particular sync pulse and how it should respond to failures, such as missing a sync pulse.

In the illustrated embodiment, each digital playback unit is configured to communicate not only with the local controller, but also with each of the other digital playback units of the display array. This DPU-DPU communication is advantageous for troubleshooting and handling failure conditions in the event of a local controller failure. In an alternate embodiment, the functionality of the local controller could be accomplished by a master digital playback unit.

Display Array

Figure 3A:
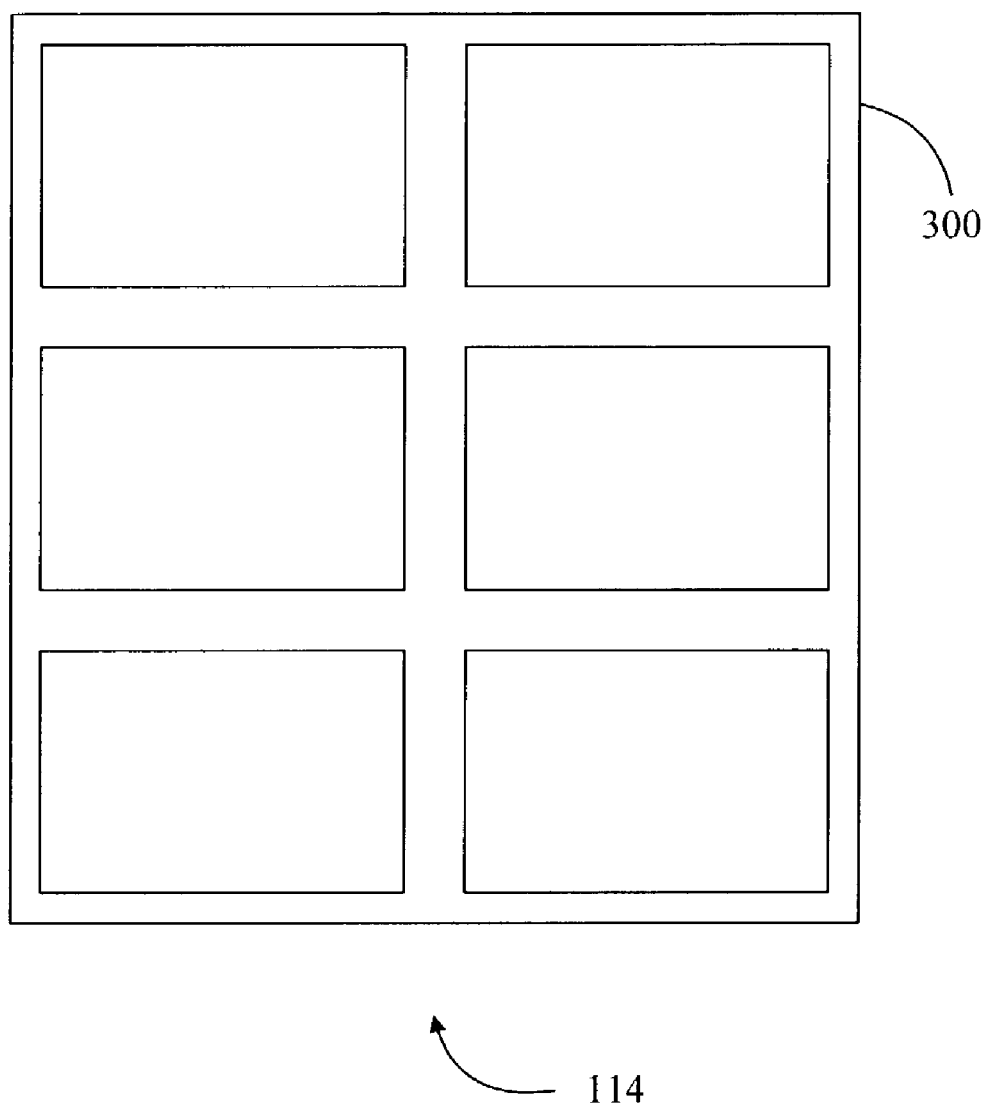
FIG. 3A is a front view of a display array in accordance with one embodiment of the present invention.

The digital playback units of the present invention, such as digital playback units 132, 134, 136, 138, 140 and 142, may be grouped to form a display array, such as display array 114 shown in FIG. 3A. In the illustrated embodiment, display array 114 includes frame 300. In alternate embodiments, the digital playback units of a display array may be arranged without a frame to form a display array.

Frame 300 is a grid or enclosure that provides structural support for the enclosed digital playback units. Frame 300 may function as a stand alone display, or it may transmit the weight of the individual digital playback units to another support structure, such as an interior wall in a building. In alternate embodiments, a display array may include a frame that serves to duct air and wire and may not serve as a load bearing structure.

The digital playback units are mounted in frame 300 such that each digital playback unit may be easily installed and replaced by personnel without technical training. For example, each digital playback unit may slide into a hinged portion of frame 300, and connect to communication lines embedded within frame 300 via one or more low insertion force or other connectors. Such communication lines may be electrical or optical in nature.

Frame 300 does not include a rear covering, although in alternate embodiments, such a covering may be provided. The digital playback units of display array 114 are configured to communicate with local controller 112 to receive media, show data, schedule data, software updates and control information. The digital playback units of display array 114 are preferably configured to communicate among themselves in the event that the communication link between the local controller and one or more digital playback units malfunctions.

Figure 3B:
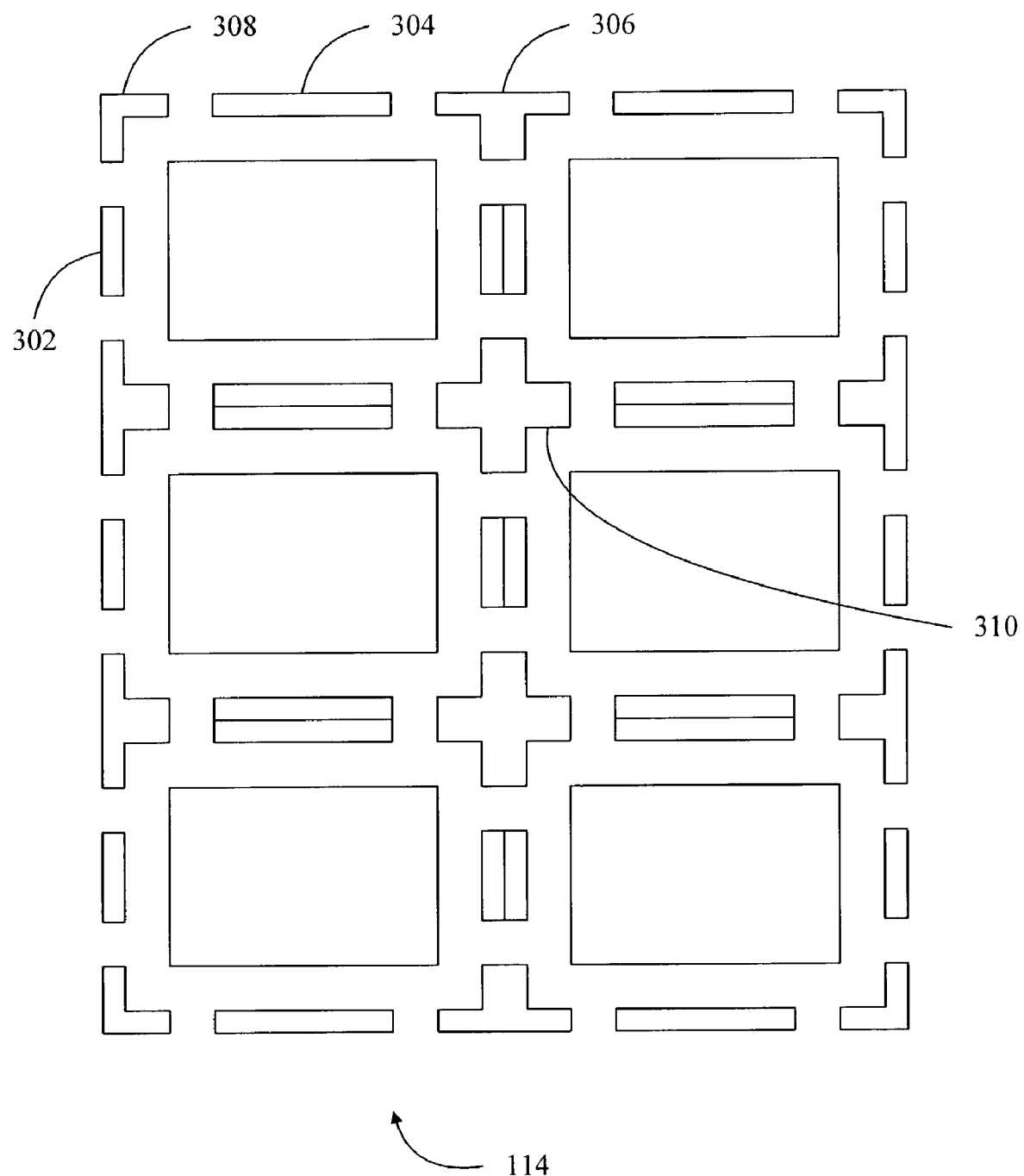
FIG. 3B is an exploded front view of the display array of FIG. 3A.

Referring now to FIG. 3B, an exploded view of display array 114 is illustrated. As shown, frame 300 is a modular frame comprising vertical members such as vertical member 302, horizontal members such as horizontal member 304, and nodes connecting the vertical and horizontal members, such as T node 306, corner node 308 and cross node 310. Each modular element of frame 300 is designed to interconnect with other elements to enable configuration of display arrays of various sizes and shapes.

Each modular element of frame 300 may form one or more interior heat management channels. Each element of modular frame 300 may further include embedded communication lines to transmit power, data or other signals to/from one or more digital playback device.

Figure 3C:
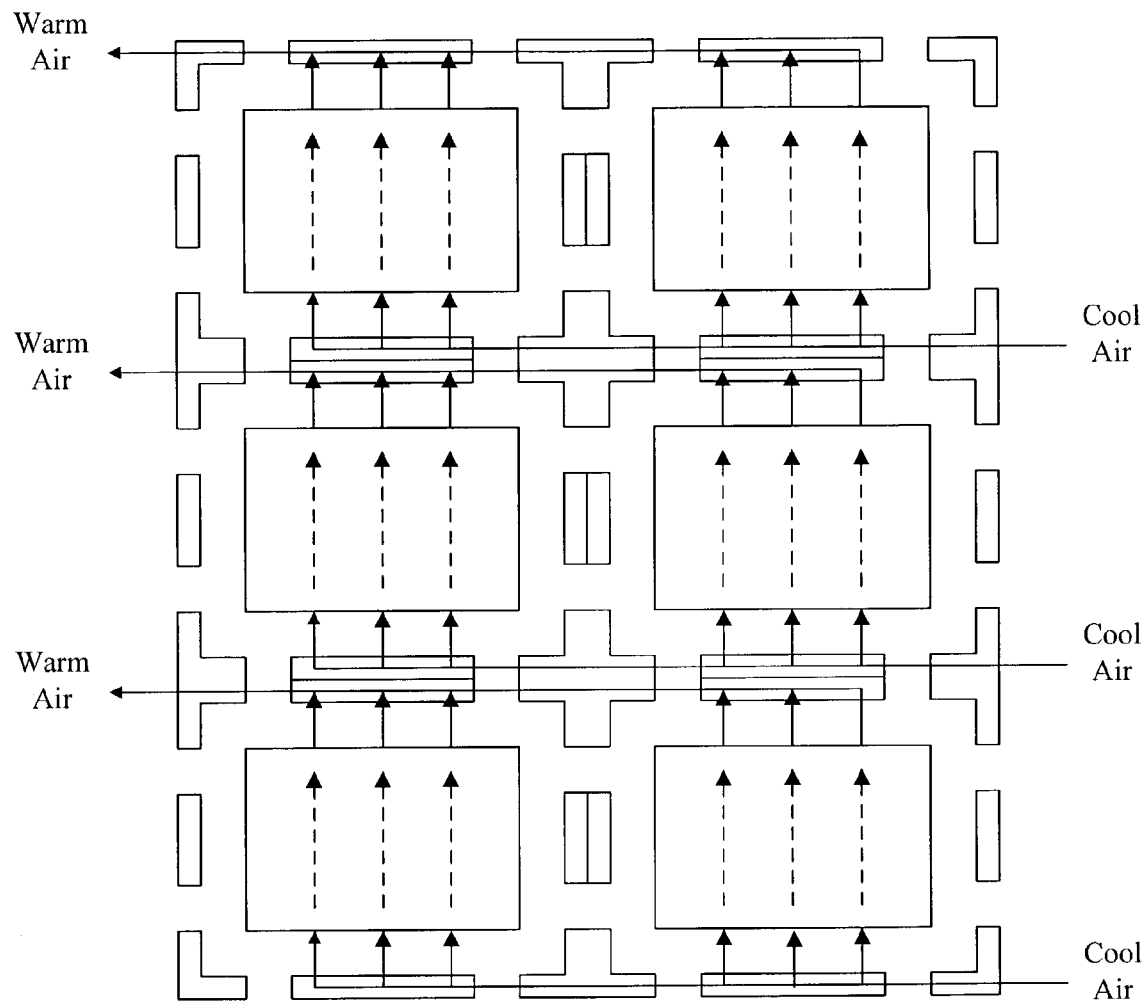
FIG. 3C is an exploded front view of the display array of FIG. 3A illustrating one exemplary heat management system.

Referring now to FIG. 3C, there is illustrated one possible integrated heat management configuration of frame 300. To accomplish the illustrated heat management, the vertical elements, horizontal elements and nodes of frame 300 may be formed to define two chambers, one which carries cool supply air from the surrounding space or an air cooling unit, and one which contains heated air exhausted from the digital playback units and/or other devices within frame 300. To increase the heat transfer efficiency, cool supply air is kept segregated from warm exhaust air. Of course, such air flow may be reversed where the display array is mounted in a frigid environment, thereby maintaining a minimum operating temperature.

In addition to forming air flow channels, the elements of frame 300 may include other accessories to enhance or improve the heat management functionality. For example, in one alternate embodiment, an element may include an embedded fan to promote airflow. In another alternate embodiment, an element may include a filter to prevent contamination of the digital playback units by supply air. In yet another alternate embodiment, an element may be formed to enable connection to an external air conditioning source.

In order to enhance or improve the performance of any communication lines embedded within frame 300, elements of frame 300 may also include certain accessories, such as a power module for receiving external power or a LAN module for connecting to the local controller, for example.

It should be understood that frame 300 is not limited to supporting only digital playback units. Frame 300 may also contain other devices that allow the input and output of digital information into the network that is generated/read through sensors and/or other input/output devices either mounted internally or externally to the display. Audio amplifiers and/or speakers may also be supported by frame 300 to playback audio program material.

Figure 3D:
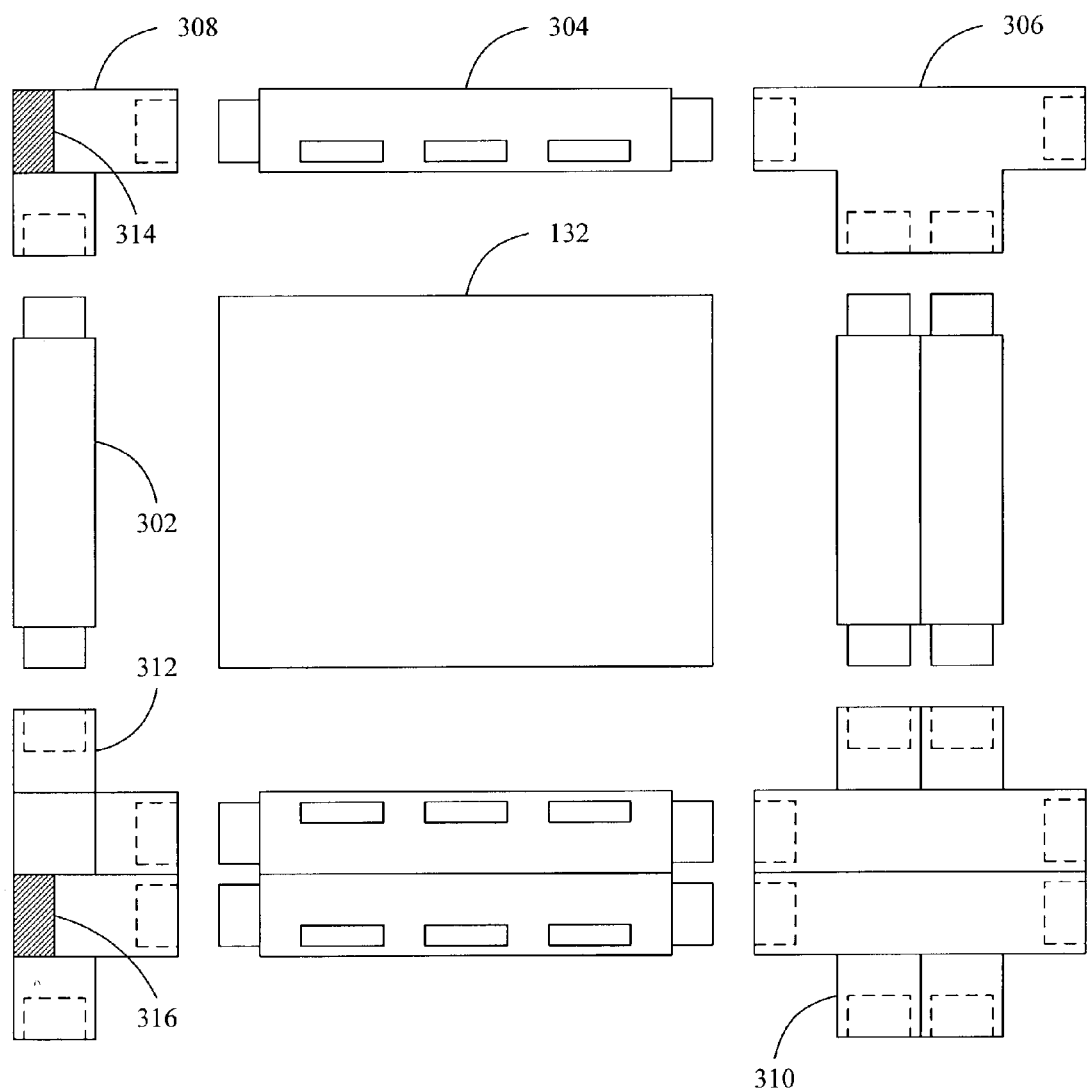
FIG. 3D is an detailed exploded front view of the upper left segment of the display array of FIG. 3A.

FIG. 3D illustrates in greater detail certain advantageous features of the modular components comprising the upper left segment of frame 300. In this view, for example, it is illustrated that each modular frame component is designed to interconnect using a snap or friction fit and may form an air duct for conducting warm or cool air. Cross node 310 includes two horizontal air ducts. Corner node 308 and T node 312 include integrated fans 314 and 316, respectively for expelling warm air from frame 300. Horizontal member 304 forms several vents for directing air flow across digital playback unit 132. Of course, other embodiments of such modular components are contemplated.

Figure 4A:
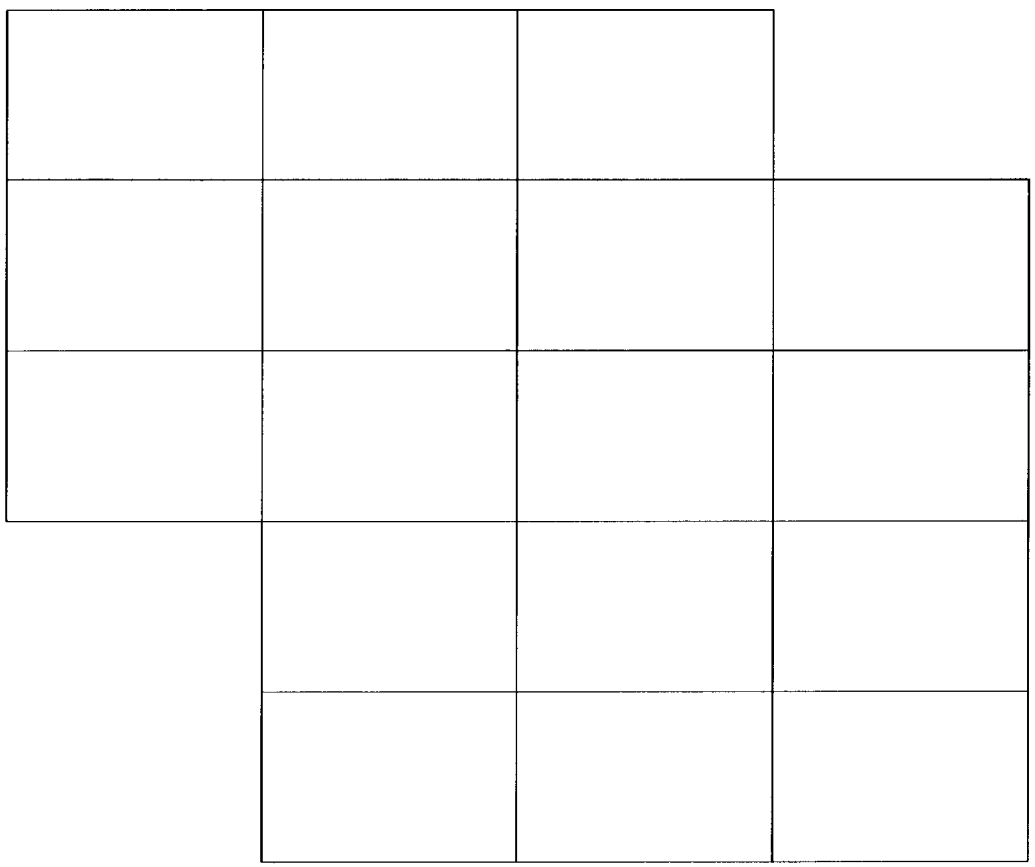
FIGS. 4A–4C illustrate various display array configurations in accordance with the present invention.
Figure 4B:
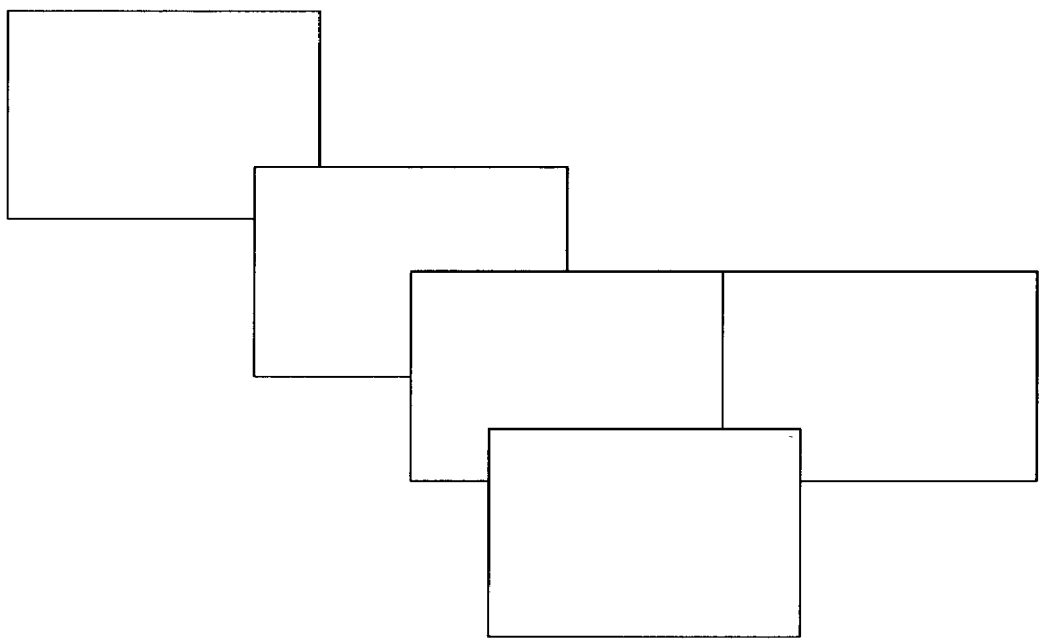
Figure 4C:
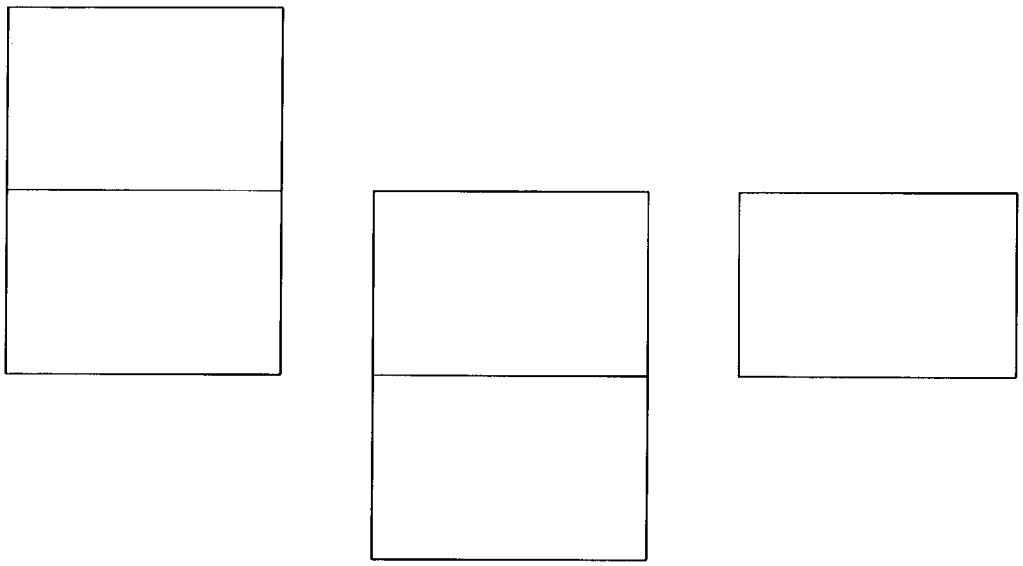

FIGS. 4A–4C illustrate various frameless display arrays supported by the present invention. FIG. 4A illustrates display arrays of the present invention need not be limited to rectangular shapes. FIG. 4B illustrates that the digital playback devices comprising a display array may overlap one another, providing a three-dimensional effect. FIG. 4C illustrates that the digital playback units of the present invention need not be adjacent to form a display array.

The use of the modular digital playback units to comprise a display array provides several significant advantages over the video walls of the prior art.

The display area of the display array of the present invention is comprised of a number of modular DPU's that are arrayed and collectively make up the full display area. This allows for the graphics and/or other information to be divided up or "sliced" into pieces or segments and stored in files specific only to these areas or segments. Only the digital information specific to each segment is stored and processed on the DPU associated with that segment.

Unlike the video walls of the prior art, as a display array of the present invention is scaled larger, the resolution of the display, the number of pixels per inch, remains constant. This allows displays of all sizes, including very large displays, to maintain the same high-resolution characteristics. By arraying and assigning the processors and memory in this fashion, it allows for more effective storage and display of higher resolution imagery than with other solutions.

Since each DPU is self contained with the necessary hardware and software for playback, these modular units can be arrayed (or tiled) next to each other in any number of units to create any size display. There is no theoretical limit to size or shape as with other solutions.

The modular design of the displays allow for very creative applications that are not provided by other solutions. Displays can be created in various two dimensional aspect ratios and shapes. Displays can also be configured in various three dimensional shapes—even wrapped around columns etc. DPU's can be staggered in front/behind each other and overlapped as well.

In contrast to other solutions, outboard processors or playback devices are not required, the only space requirement for the display is the display itself.

The self-contained modular approach greatly reduces the installation complexity associated with other solutions. Standard voltage AC power and a common network wire are all that is required for each display. There are no external processors or playback devices needed to be connected and programmed. The embedded software and hardware contained in each DPU is designed to be auto initializing and auto start-up on power-up. There is no alignment or adjustment needed as with other solutions.

Due to the modular approach, any DPU failures that occur will only affect the area or quadrant relative to that DPU. The loss of an entire display or even a substantial portion of the display would be highly unlikely. Failures with other solutions are more likely to affect the entire display.

In the event of any failure with a DPU, non-technical personnel need only to swap out the troubled DPU with a spare or new unit. There is no troubleshooting required. The small size and weight make it very easy and affordable to simply ship the troubled DPU to a service center for repair and return of the unit.

The processing power achieved by the modular approach allows rendering and compositing of various layers and elements within the content to be done by the DPU's. Thus, with any updates to specific elements within the content that do not effect other elements, only the affected elements need to be distributed and not the entire file. This can greatly reduce the file size and therefore the cost and/or efficiency of distributing content updates compared with other solutions with similar resolutions.

Distributing a Presentation

Figure 5:
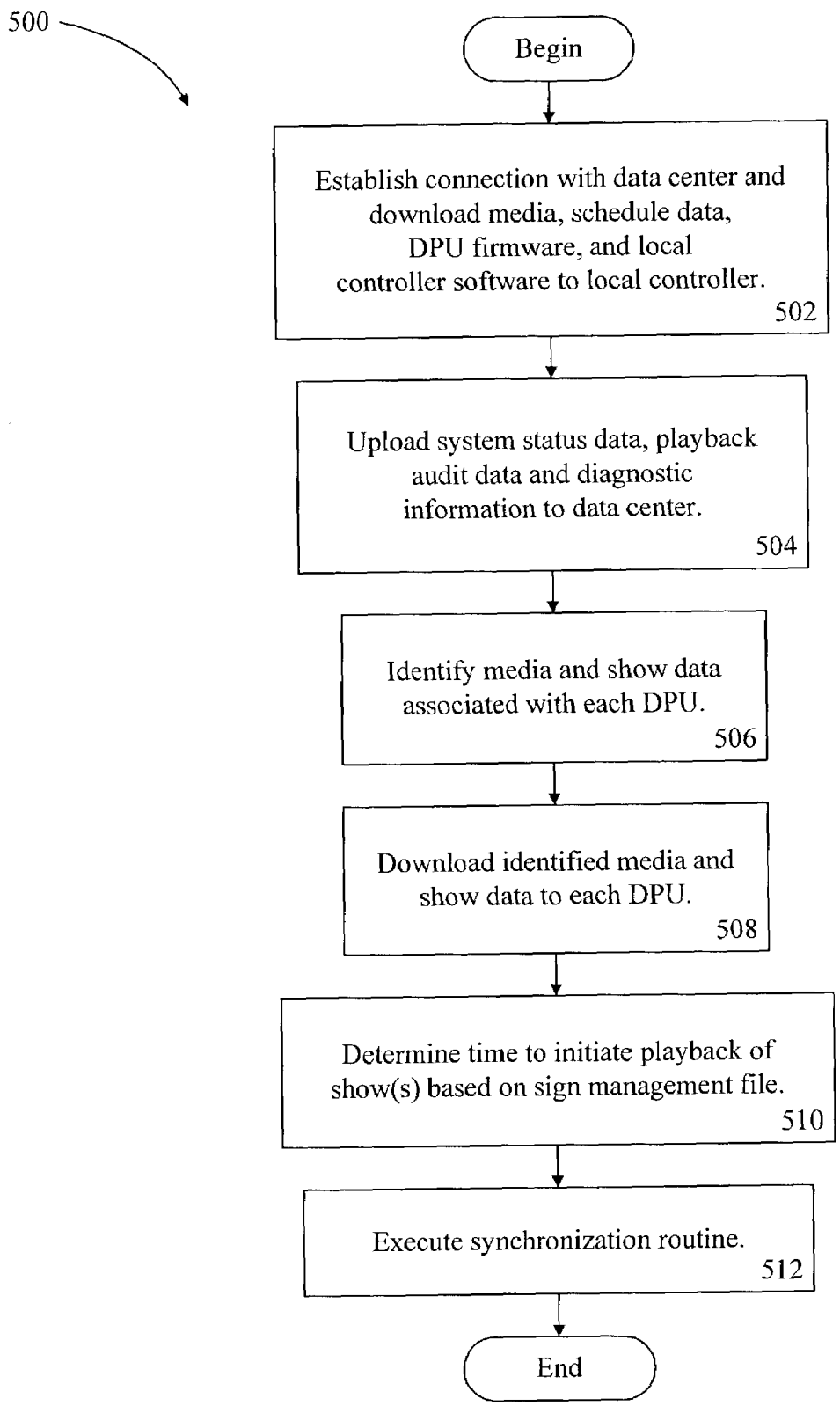
FIG. 5 is an exemplary methodology for distributing data for a presentation in accordance with one embodiment of the present invention.

Referring now to FIG. 5, a flowchart is presented illustrating an exemplary methodology for distributing a presentation in accordance with the present invention. Methodology 500 describes the distribution of media and show data from data center 108 to individual DPU's. At block 502, distribution management software running on the data center 108 establishes a connection with local controller 112. In alternate embodiments, local controller 112 may establish the connection of block 502. Upon establishing a successful connection, media, show data and schedule data are downloaded to local controller 112 from data center 108. Optionally, DPU firmware and local controller software may also be downloaded.

At block 504, local controller 112 uploads audit data representing system status or health, audit data associated with previous show playback, and other diagnostic data accumulated since the last connection. After data is exchanged between data center 108 and local controller 112, local controller 112 identifies media, show data and schedule data associated with each DPU, as shown by block 506. In order to present a complete image at a display array, each DPU needs to present a different segment of the complete presentation, based on the location of the DPU relative to the other DPU's in the associated display array.

The identification of the appropriate media and show data for each DPU may be accomplished in a static manner using predetermined addresses or in a dynamic manner by establishing a relationship between the address of a DPU and its relative location. Such dynamic addressing may be accomplished using data generated by a self discovery module.

Upon distributing the appropriate data to each DPU at step 508, local controller 112 accesses a sign management file at block 510 to determine the time to initiate playback of the distributed show(s). The DPU's of a display array are synchronized at block 512, and playback of the show is initiated in a unified fashion.

DPU Synchronization

In order to ensure a unified presentation, all of the digital playback units comprising a display array should be synchronized. In the illustrated embodiment, such synchronization is accomplished by local controller 112 broadcasting a sync pulse to all of the digital playback units comprising a display array. In the illustrated embodiment, the sync pulse is a network broadcast UDP time stamp command to each of the digital playback units of the display array, and each digital playback unit is programmed to respond based on the command content and the relative location of the digital playback unit within the display array.

To accomplish the synchronization in the illustrated embodiment, local controller 112 employs a sign management file received from data center 108. The sign management file may be a zipped data file, created at data center 108, which resides on local controller 112. The sign management file contains the following information, which is used by the local controller to make decisions:

Networking (IP) information of all resident digital playback units in associated display arrays.

Call-back information so that the local controller may determine how to contact the data center.

Cueing information—Information that dictates when, how, and for how long a show needs to run and what sync pulses, or commands, need to be generated to achieve that goal.

How a sign should respond to external data generated by a sign access module ("SAM").

Master priority list—Which DPU will take over in the case of a local controller failure.

Failure Response information—Scripting that dictates how a sign should respond to a given percentage of DPU failures. For example, instructions directing DPU performance in the event 30% of the DPU's in a display array fail.

Failure Discovery Scripting—Scripting controlling how the local controller and all associated digital playback units should proceed in the case of a failure.

Sync Response files for each DPU in a display array.

In addition to the sign management file, local controller 112 may employ a self-discovery/assignment module to accomplish synchronization of DPU's. The self-discovery/assignment module is software that enables and/or assists DPU's comprising a display array to determine the geometry of the display array, and/or the address and relative physical location of each DPU in the display array. In other embodiments, a static IP address for each DPU may be predetermined and incorporated into the show data.

Each digital playback unit of a display array employs an associated sync response file containing DPU-specific data which is created at data center 108. A set of sync response files are packaged inside of the zipped sign management file and each sync response file is delivered to the appropriate DPU by the local controller. The contents of each sync response file are tailored to the address of the digital playback unit for which the file is intended and to the addresses of the other digital playback units in the same display array. The sync response file contains the following information:

Priority information for the particular DPU—an indication of which DPU will take over in case of a local controller failure Networking information of all other digital playback units and the local controller in the system Response data used by the sync response module to playback data in sync with other digital playback units. For example, if the local controller generates sync pulse command 'q' then the sync response module looks in this table and responds by executing the command bound to 'q'—possibly play file 'q'.

Failure mode response information—Instructions directing the DPU how to respond to failures at the DPU or local controller level.

Instructions directing the DPU how to respond to a failure mode command issued by local controller.

In addition to the sync response data file, each digital playback unit employs a sync response module which is software that monitors and responds to sync pulse commands according to the sync response file.

Figure 6A:
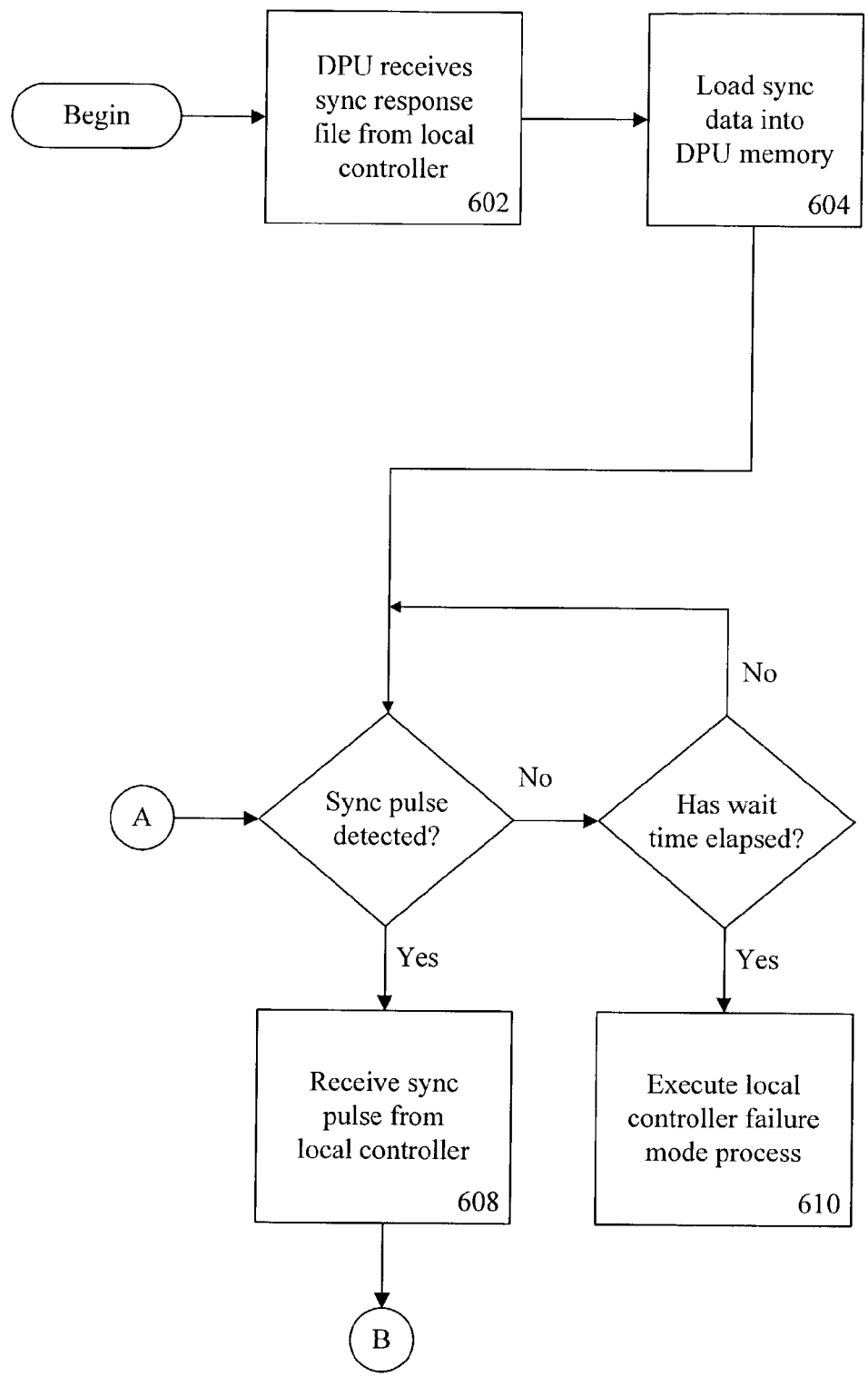
FIGS. 6A and 6B depict an exemplary methodology for synchronizing the display array in accordance with one embodiment of the present invention.
Figure 6B:
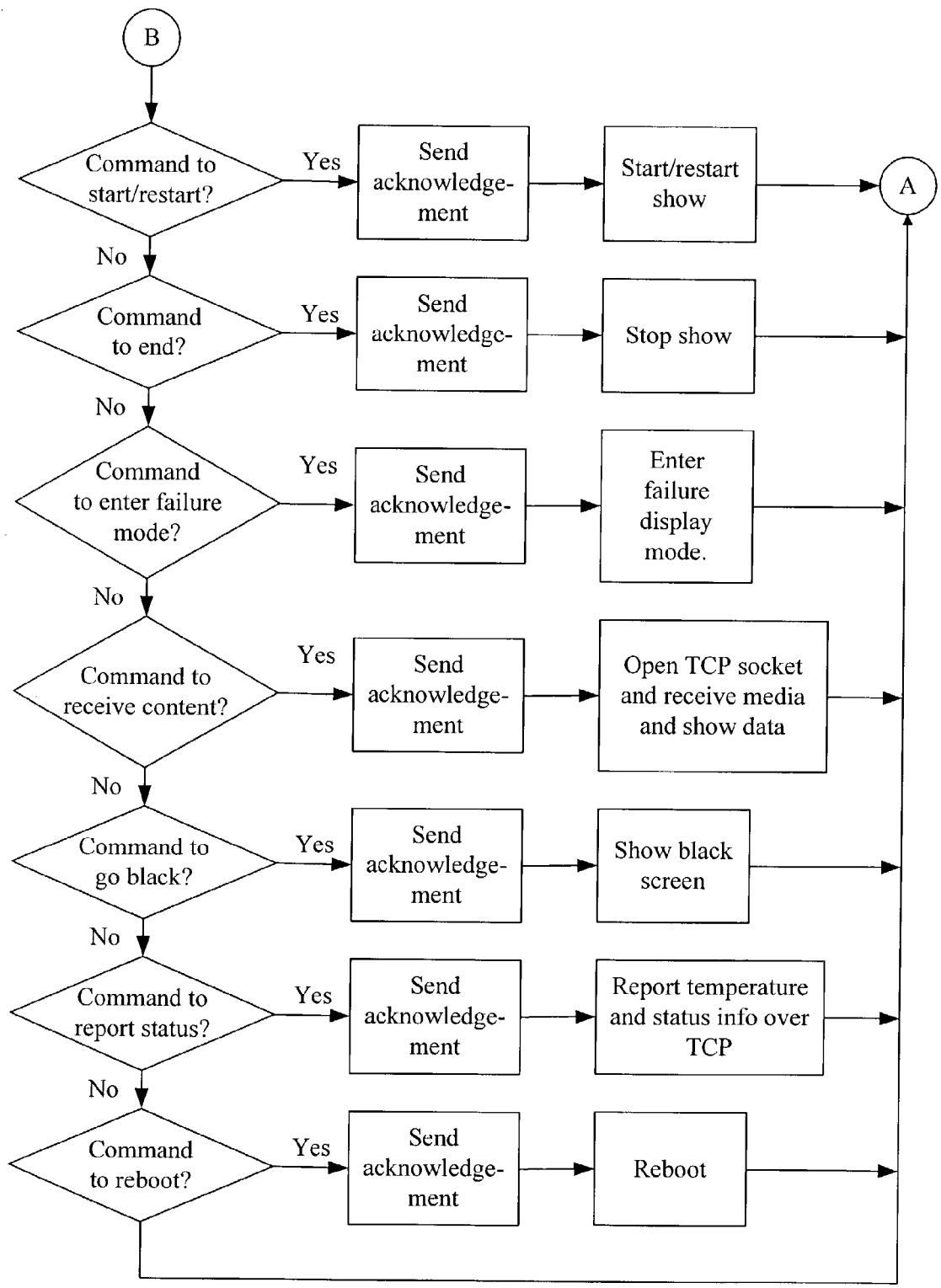

FIGS. 6A and 6B illustrate one methodology for processing a sync pulse from a local controller and synchronizing a set of digital playback units associated with a display array to provide a unified presentation. According to the methodology, a digital playback unit receives a sync response file from the local controller (block 602). The digital playback unit stores the sync response file into memory (block 604) and executes the sync response module which directs the digital playback unit to wait for a broadcasted sync pulse to be received from the local controller (block 606). Upon receiving a broadcasted sync pulse from the local controller (block 608), the sync pulse is processed based on the instructions within the sync response file associated with the embedded command, as shown in FIG. 6B. In the event the digital playback unit fails to receive a sync pulse within a prescribed time limit, the digital playback unit is directed to execute a local controller failure mode process (block 610). The local controller failure mode process is described in greater detail with reference to FIGS. 8A–8B, below.

As shown in FIG. 6B, the local controller may issue sync pulse commands for a variety of purposes, including, for example:

To identify the start or restart of a show.
To identify the end of a show.
To force the display array into a failure mode.
To transmit new content to the digital playback units.
To force the display array to go black.
To check the status of the digital playback unit and/or display array.
To reboot the system.

As shown in FIG. 6B, each digital playback unit is responsible for acknowledging receipt of any sync pulse broadcast by the local controller. Such acknowledgement may include the address of the responding digital playback unit. The local controller uses this acknowledgement information to determine if the system and/or display array is operationally sound and if each DPU has started its process as directed by the sync pulse. In some cases, one or more digital playback units may fail to provide such an acknowledgement, indicating that the digital playback unit or the connection between the digital playback unit and the local controller may be faulty. Upon failing to receive the appropriate acknowledgements, the local controller may execute a discovery process to determine the cause for the lack of response.

Figure 7A:
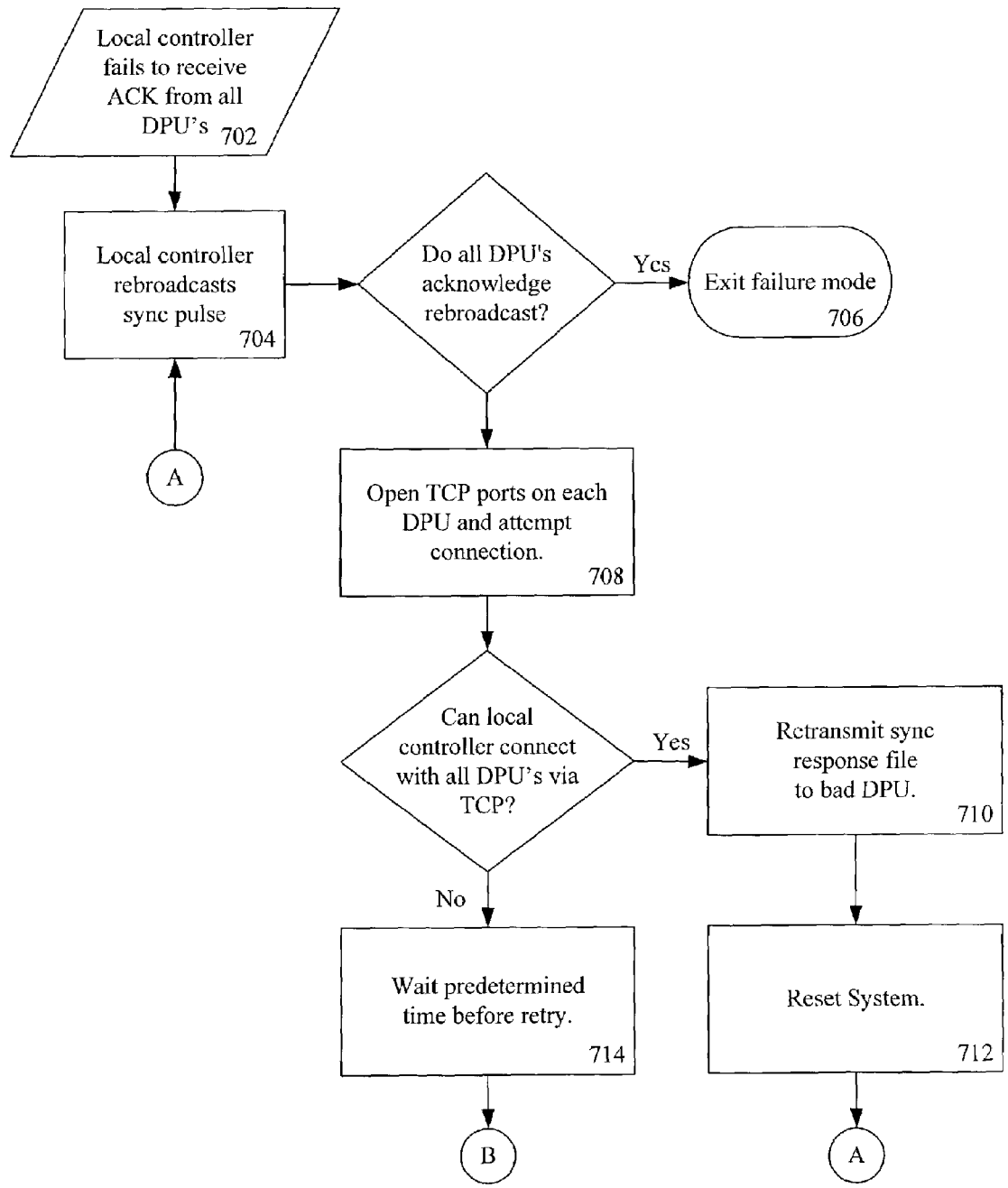
FIGS. 7A and 7B depict an exemplary methodology for identifying and processing a digital playback unit failure in accordance with one embodiment of the present invention.
Figure 7B:
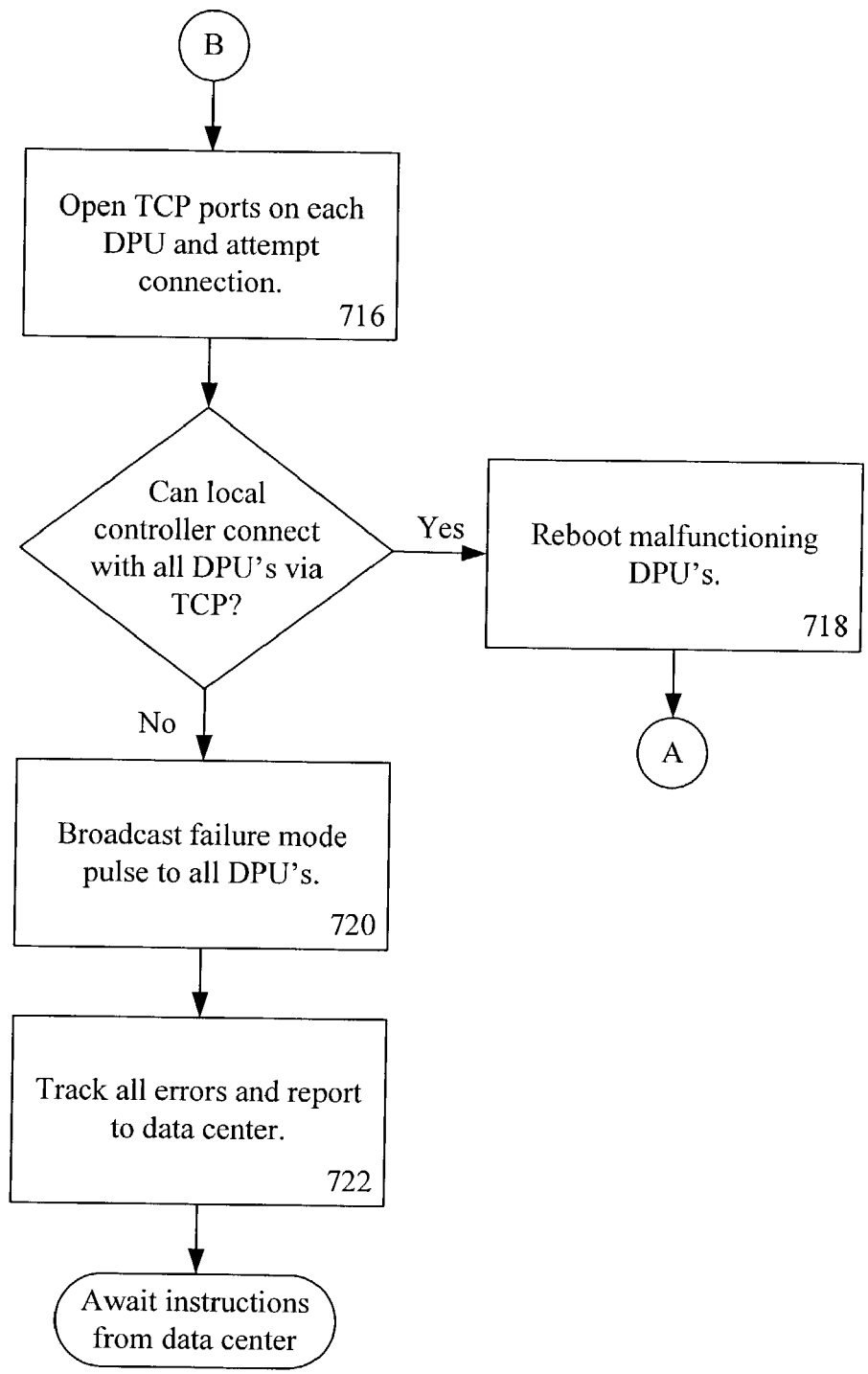

FIGS. 7A and 7B illustrate a methodology for identifying and handling such failures. If a local controller fails to receive an acknowledgement response form one or more digital playback units (block 702), the local controller rebroadcasts the sync pulse (block 704). If all digital playback units respond to the rebroadcast sync pulse, there is no longer a failure, and the failure mode process terminates (block 706).

If one or more digital playback units fail to respond to the rebroadcast sync pulse, the local controller attempts to communicate with each digital playback unit individually (block 708). If each digital playback unit responds, the local controller retransmits the sync response file associated with the originally non-responsive digital playback unit (block 710) and resets all associated digital playback units (block 712). The local controller implements the methodology of FIGS. 7A–7B based on the contents of the sign management file. The illustrated methodology is merely exemplary of the courses of action which may be taken to identify and handle DPU failures. Consequently, if other courses of action are desired, the alternate logic may be easily defined in the sign management file.

If the local controller fails to connect to each digital playback unit individually, the local controller waits for a predetermined period and retries the individual connection (blocks 714 and 716). If the local controller is able to connect to each digital playback unit on the second attempt, each malfunctioning digital playback unit is rebooted (block 718) and the sync pulse is rebroadcast.

In the event that one or more digital playback units fail to respond to the second attempt of the local controller to individually connect, the local controller broadcasts a sync pulse indicating that the display array is in failure mode (block 720). The local controller then tracks all errors and reports them to the data center (block 722), and awaits instructions from the data center.

Figure 8A:
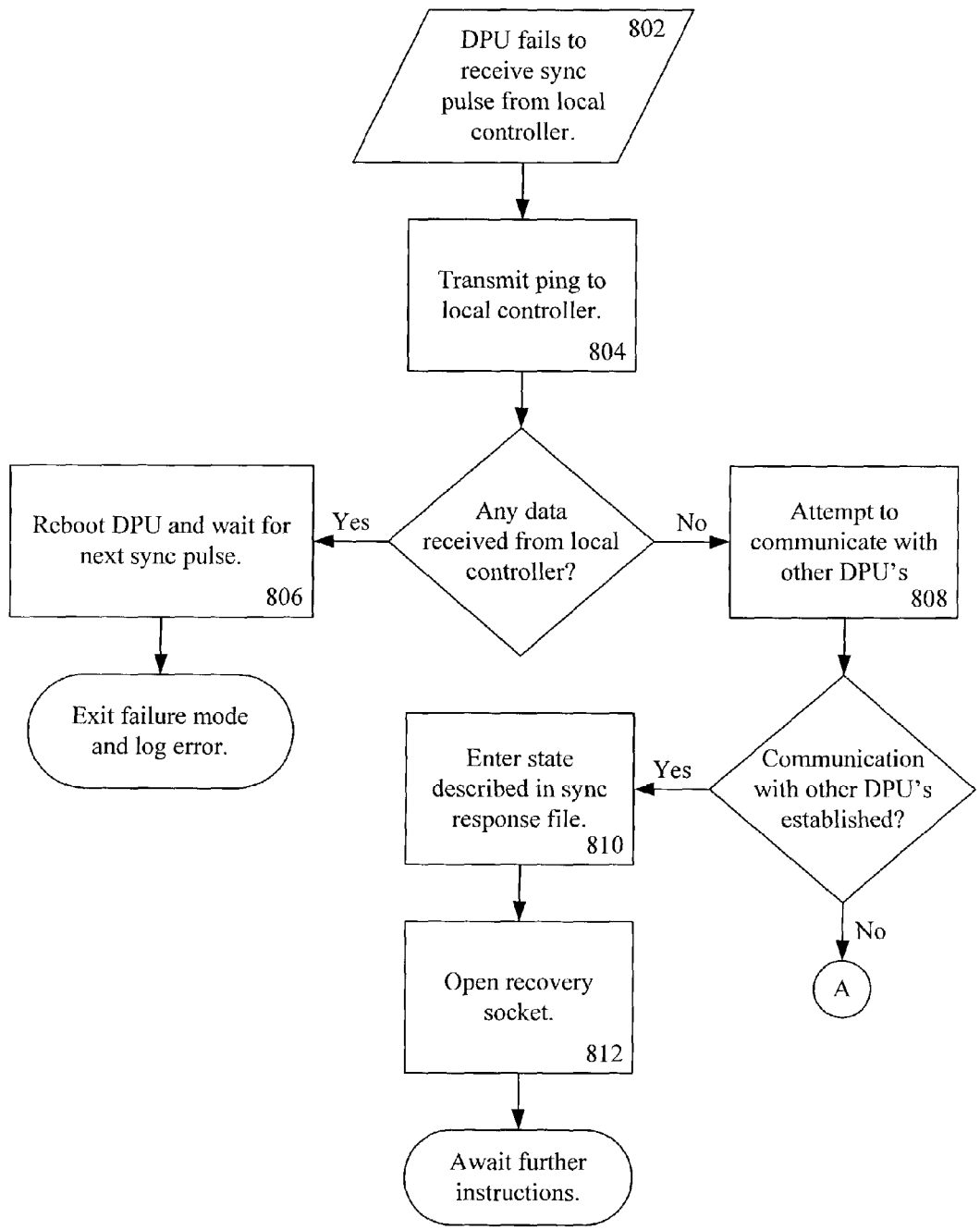
FIGS. 8A and 8B depict an exemplary methodology for identifying and processing a local controller failure in accordance with one embodiment of the present invention.
Figure 8B:
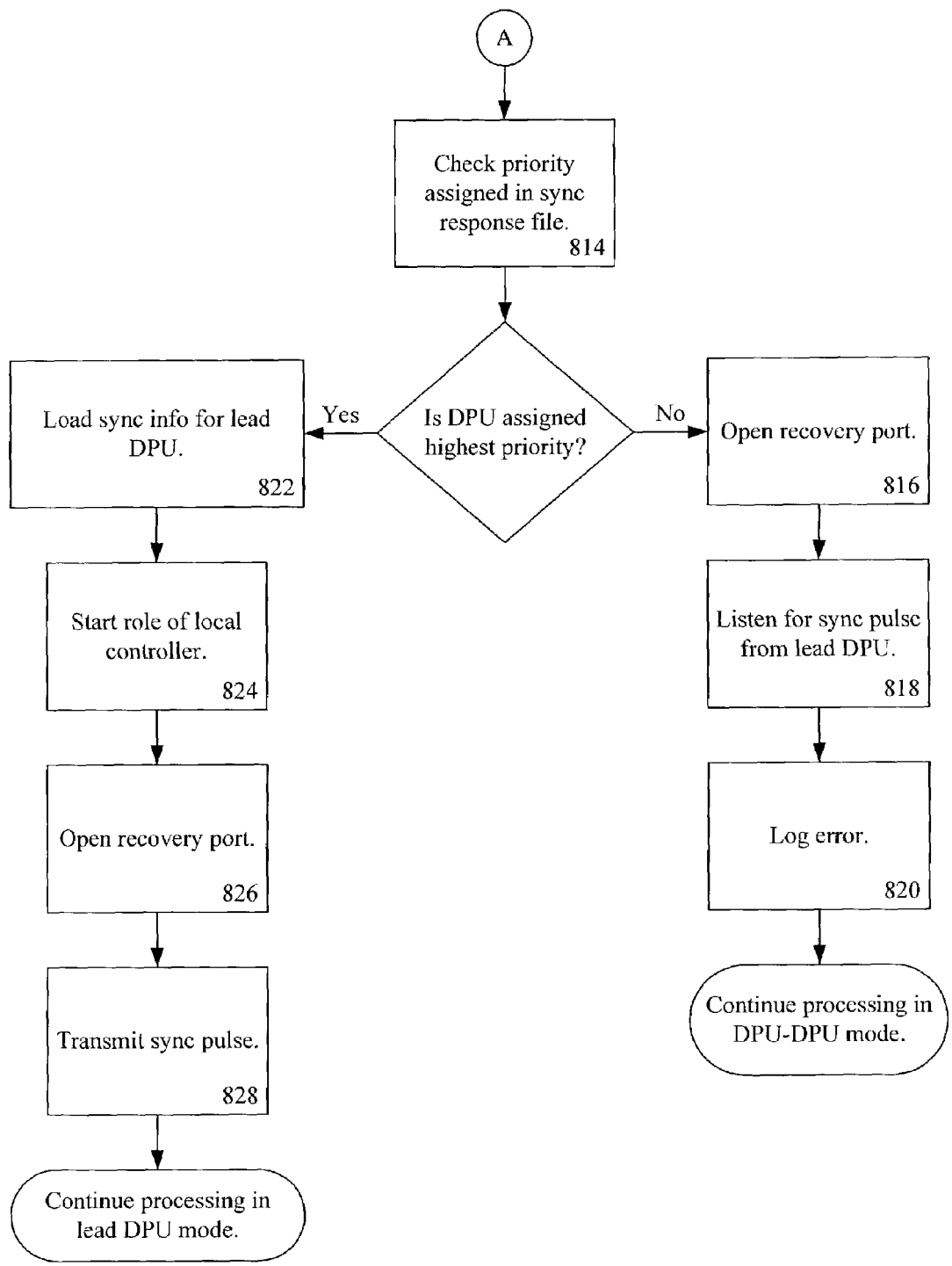

In some cases, the local controller may fail. The digital playback units of the exemplary system are equipped to identify such a failure and continue operating as a unified display array by relying on an assigned lead digital playback unit to take over the synchronization responsibilities of the local controller in the event of a failure. FIGS. 8A–8B depict one methodology for identifying and handling a local controller failure. In the event that all digital playback units determine that the local controller has failed, but that all digital playback units are operational and in communication with each other, the DPU with the highest priority (as determined by location and sync response file) will take over the role of generating the sync pulse to all digital playback units in the display array.

The illustrated methodology is processed in the event that a digital playback unit fails to receive a sync pulse from the local controller (block 802). To test the connection between the digital playback unit and the local controller, the digital playback unit transmits a ping to the local controller (block 804). If the digital playback unit receives data from the local controller in response to the ping, the digital playback unit is rebooted and directed to await the next sync pulse (block 806). The error is logged and the failure mode is exited.

If the digital playback unit fails to receive any data from the local controller in response to the ping, the digital playback unit attempts to communicate with the other digital playback units of the display array. (block 808). If the digital playback unit fails to establish communication with the other digital playback units of the display array, the digital playback unit enters a state described in it's sync response file (block 810) and opens a recovery socket (block 812).

If communication with the other digital playback units is established, the digital playback unit determines whether it is considered the lead digital playback unit assigned the highest priority. If it is not assigned the lead digital playback unit, a recovery port is opened (block 816) and the digital playback unit listens for a sync pulse from the lead digital playback unit (block 818). The error is logged (block 820), and the digital playback unit continues to operate by responding to sync pulses generated by the lead digital playback unit.

If the digital playback unit is the lead digital playback unit for the display array, the digital playback unit loads lead sync information from the sync response file (block 822). The digital playback unit assumes the role of the local controller (block 824) and opens a recovery port to the other digital playback units (block 826). The local controller transmits the sync pulse (block 828) as necessary and continues processing as the lead digital playback unit.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method for distributing an audio/visual presentation, comprising:
   storing on a central server show data representing an audio/visual presentation, and a plurality of graphical objects associated with the show data;
   processing the show data and the plurality of graphical objects to create a plurality of audio/visual presentation data files, each audio/visual presentation data file representing a segment of the audio/visual presentation;
   transmitting the plurality of audio/visual presentation data files from the central server to a local controller;
   transmitting each audio/visual presentation data file from the local controller to at least one associated digital playback device; and
   processing the audio/visual presentation data files at the associated digital playback devices to render the audio/visual presentation.

2. The method of claim 1, further including:
   storing schedule data on the central server;
   transmitting the schedule data from the central server to the local controller;
   transmitting the schedule data from the local controller to the at least one digital playback unit; and
   processing the audio/visual presentation data files based on the schedule data.

3. The method of claim 1, further including:
   storing on the central server a local controller identifier associated with the show data; and
   determining that the plurality of audio/visual data files are to be transmitted to the local controller based on the local controller identifier.

4. The method of claim 1, wherein:
   processing the show data includes determining synchronization data; and
   processing the audio/visual presentation data files includes utilizing the synchronization data to synchronize the audio/visual presentation.

5. The method of claim 1, wherein processing the audio/visual presentation data files includes generating audit and performance data; and the method further includes transmitting the audit and performance data from the digital playback unit to the local controller.

6. The method of claim 5, further including:
   accumulating the received audit and performance data; and
   transmitting accumulated audit and performance data from the local controller to the central server.

7. The method of claim 6, further including generating an audit report based on the accumulated data.

8. The method of claim 6, further including generating a performance report based on the accumulated data.

9. A method for distributing a visual presentation, comprising: storing show data and media referenced by the show data at a data center; processing the show data and media to generate a plurality of visual presentation data files; distributing each visual presentation data file to at least one digital playback device, wherein distributing includes: receiving the plurality of visual presentation data files at a local controller; and transmitting each visual presentation data file from the local controller to at least one digital playback device.

10. A visual presentation distribution and control system, comprising:
   a data center including stored show data representing a visual presentation and media referenced by the show data, the data center operative to process the show data and media to generate a plurality of visual presentation data files, each visual presentation data file representing a segment of the visual presentation;
   a display array comprising a plurality of digital playback devices, each digital playback device configured to process a visual presentation data file; and
   a local controller in communication with the data center and the plurality of digital playback devices, the local controller including control logic to receive and distribute each visual presentation data file to an associated digital playback device.

* * * * *